(12) United States Patent
Xiong et al.

(10) Patent No.: US 11,545,677 B2
(45) Date of Patent: Jan. 3, 2023

(54) FUEL CELL VEHICLE THERMAL MANAGEMENT SYSTEM WITH COLD START FUNCTION AND CONTROL METHOD THEREOF

(71) Applicant: Zhejiang University, Hangzhou (CN)

(72) Inventors: Shusheng Xiong, Hangzhou (CN); Xiaoxuan Zhang, Hangzhou (CN); Wei Li, Hangzhou (CN); Renpu Jiang, Hangzhou (CN); Zhankuan Wu, Hangzhou (CN); Shiyan Ye, Hangzhou (CN); Guodong Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/607,216

(22) PCT Filed: Dec. 18, 2019

(86) PCT No.: PCT/CN2019/126255
§ 371 (c)(1),
(2) Date: Oct. 28, 2021

(87) PCT Pub. No.: WO2020/233110
PCT Pub. Date: Nov. 26, 2020

(65) Prior Publication Data
US 2022/0149396 A1    May 12, 2022

(30) Foreign Application Priority Data

May 20, 2019    (CN) .......................... 201910418641.1

(51) Int. Cl.
*H01M 8/04029* (2016.01)
*H01M 8/04223* (2016.01)
(Continued)

(52) U.S. Cl.
CPC ..... *H01M 8/04029* (2013.01); *H01M 8/0267* (2013.01); *H01M 8/04067* (2013.01);
(Continued)

(58) Field of Classification Search
CPC ......... H01M 8/04029; H01M 8/04302; H01M 8/0267; H01M 8/04067; H01M 8/04268; H01M 2250/20
See application file for complete search history.

(56) References Cited

U.S. PATENT DOCUMENTS

| 2002/0037447 A1 | 3/2002 | Imaseki |
| 2017/0263954 A1* | 9/2017 | Shaikh .............. H01M 8/04701 |

FOREIGN PATENT DOCUMENTS

| CN | 207398272 U | 5/2018 |
| CN | 108511775 A | 9/2018 |

(Continued)

*Primary Examiner* — Stewart A Fraser
*Assistant Examiner* — Brent C Thomas
(74) *Attorney, Agent, or Firm* — Muncy, Geissler, Olds & Lowe, P.C.

(57) ABSTRACT

A fuel cell vehicle thermal management system with cold start function includes a fuel cell stack, electronic water pump, electronic thermostat, cold start heater and first solenoid valve, all connected to a thermal management controller, and air intake preheating heat exchangers. The coolant outlet of the fuel cell stack is connected with an inlet of the electronic water pump, and an outlet of the electronic water pump is connected with the inlets of the electronic thermostat and the first solenoid valve. The first outlet of the electronic thermostat is connected with the inlet of the heater. The outlet of the heater is connected with the inlet of the fuel cell stack. The outlet of the first solenoid valve is connected with the inlet of the intake preheating heat exchanger. The outlet of the intake preheating heat exchanger is connected with the inlet of the heater.

10 Claims, 2 Drawing Sheets

(51) Int. Cl.
  *H01M 8/04302* (2016.01)
  *H01M 8/0267* (2016.01)
  *H01M 8/04007* (2016.01)

(52) U.S. Cl.
  CPC ... *H01M 8/04268* (2013.01); *H01M 8/04302* (2016.02); *H01M 2250/20* (2013.01)

(56) References Cited

FOREIGN PATENT DOCUMENTS

| CN | 109378498 A | 2/2019 |
| CN | 109532565 A | 3/2019 |
| CN | 110165247 A | 8/2019 |
| JP | 2007294305 A | 11/2007 |

* cited by examiner

FUEL CELL VEHICLE THERMAL MANAGEMENT SYSTEM WITH COLD START FUNCTION AND CONTROL METHOD THEREOF

TECHNICAL FIELD

The invention relates to the technical field of new energy vehicles, in particular to a fuel cell vehicle thermal management system with cold start function and a control method thereof.

BACKGROUND

Countries all over the world are actively developing new energy technologies. As a new energy vehicle with low oil consumption, high energy conversion rate, zero emission, and low noise, fuel cell vehicles are considered to be an important way to solve the energy crisis and environmental degradation. The "Energy Technology Revolution and Innovation Action Plan (2016-2030)" organized by the National Development and Reform Commission and the National Energy Administration has deployed 15 key tasks including hydrogen energy and fuel cell technology innovation.

The current use of pure electric vehicles is limited by the energy density of the power battery, and the driving range is limited. In winter, electric heating is used to heat the vehicle and in summer to provide cooling for air conditioning, which further limits the driving range of pure electric vehicles. Fuel cell vehicles only need to provide fuel for refilling, which greatly increases the driving range. In a fuel cell vehicle, a proper working range can ensure the safety and cycle life of the power battery; considering the thermal comfort of the human body, it is also necessary to control the temperature of the passenger compartment. The cold start of fuel cell is a major problem that limits the operation of fuel cell vehicles in cold environments.

The working characteristics of the fuel cell stack determine that the air entering the stack cannot be lower than 0° C., because the long-term low-temperature air entering the stack will cause the temperature of the monolithic membrane electrode at the stack entrance to blow down, resulting in ice piercing the membrane electrode. In addition, the temperature difference between the inlet and outlet of the monolithic membrane electrode is large, and long-term use will accelerate the degradation of the stack performance and reduce the service life. Starting the fuel cell in an environment below 0° C., due to the formation of ice and blockage of the reaction site, reduces the operating performance and life of the fuel cell, thereby causing irreversible damage to the battery components.

The utility model patent with publication number CN207398272U and publication date on May 22, 2018 discloses a thermal management system and control pipeline for a fuel cell, which is controlled by controlling the on and off of the three-way solenoid valve and the opening of the water pump. The on-off and direction of the waterway in the road, and select the radiator and heating device to start and stop according to the temperature to realize the heating, heat dissipation and insulation of the system. It does not realize the cold start of the fuel cell in the low temperature environment and the preheating of the cold air before entering the stack, and it does not use the waste heat generated during the fuel cell operation to heat the passenger compartment and the lithium power battery, resulting in energy waste.

SUMMARY OF THE INVENTION

In order to overcome the shortcomings of the above technology, the present invention provides a fuel cell vehicle thermal management system with a cold start function and a control method thereof, thus solving the problems of cold start of fuel cell vehicle in a low temperature environment and preheating of cold air before entering the reactor.

The technical solutions adopted by the present invention to overcome its technical problems are:

A fuel cell vehicle thermal management system with a cold start function, including a fuel cell stack, an electronic water pump, an electronic thermostat, a cold start heater, a first solenoid valve, thermal management controller, and an air intake preheating structure. The water pump, the electronic thermostat, the cold start heater and the first solenoid valve are all electrically connected to the thermal management controller. The electronic thermostat includes a liquid inlet, a first liquid outlet and a second liquid outlet. The air intake preheating structure includes an air intake preheating heat exchanger arranged in the air duct; the coolant outlet of the fuel cell stack is connected with the liquid inlet of the electronic water pump, and the liquid outlet of the electronic water pump is connected to the inlet of the electronic thermostat. The coolant outlet of the fuel cell stack is connected with the liquid inlet of the electronic water pump, and the liquid outlet of the electronic water pump is connected with the liquid inlet of the electronic thermostat and the liquid inlet of the first solenoid valve. The first liquid outlet of the electronic thermostat is connected with the liquid inlet of the cold start heater, and the liquid outlet of the cold start heater is connected with the liquid inlet of the fuel cell stack. The liquid outlet of the first solenoid valve is connected with the liquid inlet of the air intake preheating heat exchanger, and the liquid outlet of the air intake preheating heat exchanger is connected with the liquid inlet of the cold start heater.

The air intake preheating structure further includes an intake filter, an intake compressor, a humidifier, a back pressure valve and a muffler. After the air enters the air intake air passage under the drive of the intake compressor, it is filtered by the intake filter, heated by the intake preheating heat exchanger, and humidified by the humidifier, and then enters the fuel cell stack, and the fuel cell stack After the fuel mixing reaction is completed, the fuel inside is discharged through the humidifier, the back pressure valve and the muffler in sequence.

The present invention also includes a waste heat control loop including a second solenoid valve, a lithium power battery heat exchanger, a lithium power battery, a third solenoid valve, a passenger compartment heat exchanger, a fourth solenoid valve, and a fuel cell radiator. The lithium power battery heat exchanger is set directly opposite to the lithium power battery. The second liquid outlet of the electronic thermostat is connected with the liquid inlet of the second solenoid valve, the liquid inlet of the third solenoid valve and the liquid inlet of the fourth solenoid valve. The liquid outlet of the second solenoid valve is connected with the liquid inlet of the lithium power battery heat exchanger. The liquid outlet of the third solenoid valve is connected with the liquid inlet of the passenger compartment heat exchanger, and the liquid outlet of the fourth solenoid valve is connected with the liquid inlet of the fuel cell radiator. The liquid outlet of the lithium power battery heat exchanger, the liquid outlet of the passenger compartment heat exchanger and the liquid outlet of the fuel cell radiator are all connected with the liquid inlet of the cold start heater. The second solenoid valve, the lithium power battery heat exchanger, the third solenoid valve, the passenger compartment heat exchanger, the fourth solenoid valve and the fuel cell radiator are all electrically connected to the thermal management controller.

The present invention also provides a control method for a fuel cell vehicle thermal management system with a cold start function according to the above-mentioned method, which includes the following steps:

S1. Set the temperature of the coolant outlet of the fuel cell stack as Tout and the minimum start-up temperature of the fuel cell as TQ. The initial temperature of the coolant outlet of the fuel cell stack is set to T1. The thermal management controller detects the start of the coolant outlet of the fuel cell stack. Start temperature T1, if T1≤TQ, go to step S2; if T1>TQ, go to step S3 directly;

S2. Enter cold start mode, control the electronic thermostat to open the first liquid outlet, close the second liquid outlet, and at the same time start the cold start heater to heat the coolant, then start the electronic water pump to adjust the coolant flow, and then return to the test T1, when T1>0° C., complete the heating of the fuel cell stack, and then perform step S3;

S3. Execute the command to detect the ambient temperature TA. When the ambient temperature TA>0° C., the air intake does not need to be preheated, and directly execute the command to start the fuel cell stack; when the ambient temperature TA≤0° C., control the first solenoid valve Turn on, and then execute the command to start the fuel cell stack. At this time, the air intake preheating structure is controlled to open. The high temperature coolant after the fuel cell stack starts to work is pumped out by the electronic water pump and enters the intake preheating exchange through the first solenoid valve. In the heat exchanger, the air entering the air intake air passage is heated by the intake air preheating heat exchanger and the intake compressor is compressed and heated in sequence.

Further, the step S3 includes turning off the cold start heater after starting the fuel cell stack in cold start mode.

Further, after step S3, step S4 is included: when the fuel cell stack is working normally, the temperature Tout of the coolant outlet of the fuel cell stack is detected in real time, and the specific detection includes the following:

When the thermal management controller detects Tout≤TL, where TL is the lowest temperature threshold of the coolant outlet of the fuel cell stack, it controls the first liquid outlet of the electronic thermostat to open and the second liquid outlet to close. The coolant only performs a short cycle;

When the thermal management controller detects that TL<Tout<TH, where TH is the highest temperature threshold of the coolant outlet of the fuel cell stack, the fuel cell stack is in a suitable operating temperature range. Both the first liquid outlet and the second liquid outlet of the electronic thermostat are open. The cooling liquid carries out short cycle and full cycle at the same time;

When the thermal management controller detects Tout≥TH, it controls the first liquid outlet of the electronic thermostat to close and the second liquid outlet to open, so that the coolant only performs a full cycle.

Further, the short cycle refers to the state where the first liquid outlet of the electronic thermostat is opened and the second liquid outlet is closed; the full cycle refers to the state where the first liquid outlet of the electronic thermostat is closed and the second liquid outlet is closed. The full cycle refers to a state where the first liquid outlet of the electronic thermostat is closed and the second liquid outlet is opened. The full circle refers to a state where the first liquid outlet of the electronic thermostat is closed and the second liquid outlet is opened. When the first liquid outlet and the second liquid outlet of the electronic thermostat are both open, the short cycle and the full cycle are performed simultaneously.

Further, let the TL be 40° C. and the TH be 70° C.

Further, in the step S4, when Tout>TL, that is, when the coolant has a full circle, the thermal management controller also performs waste heat control on the high-temperature coolant flowing from the second outlet of the electronic thermostat, which specifically includes the following:

When the lithium power battery needs to be heated, the thermal management controller controls to open the second solenoid valve, the high-temperature coolant in the full cycle enters the lithium power battery heat exchanger, and controls to open the fan of the lithium power battery heat exchanger to provide warm air for the lithium power battery.

When the passenger compartment needs to be heated, the thermal management controller controls to open the third solenoid valve, the full circle part of the high temperature coolant enters the passenger compartment heat exchanger, and controls the fan that opens the passenger compartment heat exchanger to provide warm air for the passenger compartment.

Further, when the remaining unusable waste heat of the fuel cell stack is left, the thermal management controller controls to open the fourth solenoid valve, and the remaining high-temperature coolant of the full cycle enters the fuel cell radiator, and controls and adjusts the air intake of the fan of the fuel cell radiator. After cooling, the cooling liquid flows back into the fuel cell stack to cool the fuel cell stack while ensuring that TL<Tout<TH.

The beneficial effects of the present invention are:

1. The invention overcomes the problem that fuel cell stack cannot be started in a low temperature environment. The cold start heater heats the coolant in the short cycle, which provides preheating for the fuel cell stack in a low temperature environment. It avoids the irreversible damage to the stack caused by the start-up of the fuel cell in a low temperature environment. And use the waste heat of the fuel cell stack coolant to preheat the low-temperature air, reduce the temperature difference between the inlet and outlet of the monolithic membrane electrode, and extend the service life of the fuel cell stack.

2. The present invention also to the fuel cell stack is supplied to the heat insulation lithium battery to ensure the lithium battery at a suitable temperature, provided to the passenger compartment in order to give the occupant a comfortable warm air. The remaining heat is dissipated by the fuel cell radiator. The invention fully considers the energy consumption of the battery and prolongs the driving range of the fuel cell vehicle.

3. The invention controls the fuel cell stack to work in a suitable temperature range, which not only improves the working efficiency of the battery, but also prolongs the service life of the fuel cell stack.

4. The invention has a simple structure and does not need to add complicated pipelines and wiring harnesses. It can ensure the safety and reliability of the entire fuel cell vehicle system, and has great promotion and application value.

In the picture: 1—fuel cell stack, 2—electronic water pump, 3—electronic thermostat, 4—cold start heater, 5—first solenoid valve, 6—intake air preheating heat exchanger, 7—second solenoid valve, 8—lithium power battery heat exchanger, 9—lithium power battery, 10—third solenoid valve, 11—passenger compartment heat exchanger, 12—fourth solenoid valve, 13—fuel cell radiator, 14—thermal management controller, 15—intake filter, 16—intake compressor, 17—humidifier, 18—back pressure valve, 19—muffler.

DETAILED DESCRIPTION OF EMBODIMENTS

In order to facilitate those skilled in the art to better understand the present invention, the present invention will be further described in detail below in conjunction with the accompanying drawings and specific embodiment. The following are only exemplary and do not limit the protection scope of the present invention.

Figure 1:
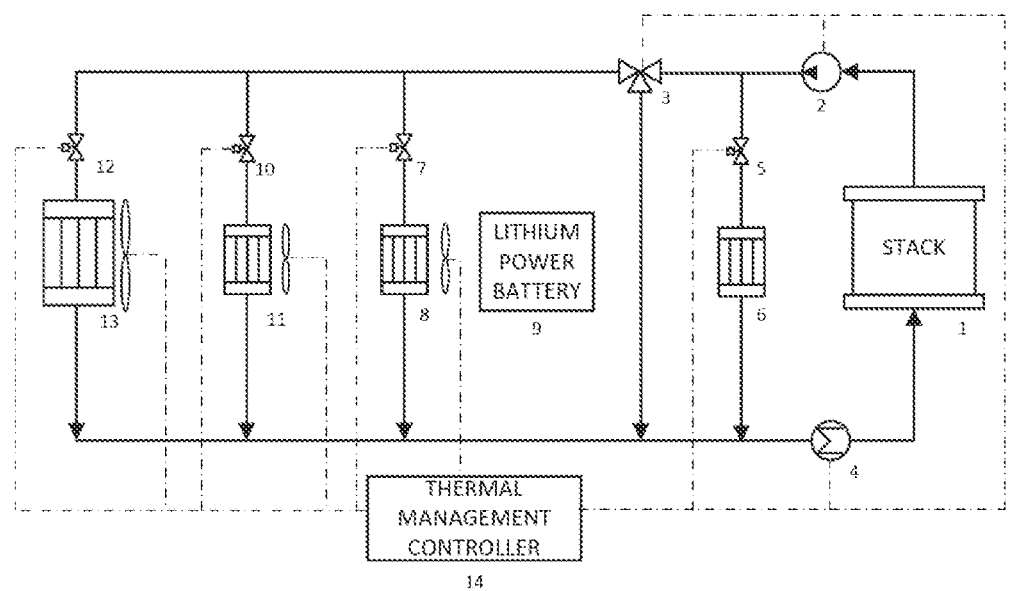
FIG. 1 is a schematic structural diagram of a fuel cell vehicle thermal management system with cold start function according to an embodiment of the present invention.
Figure 2:
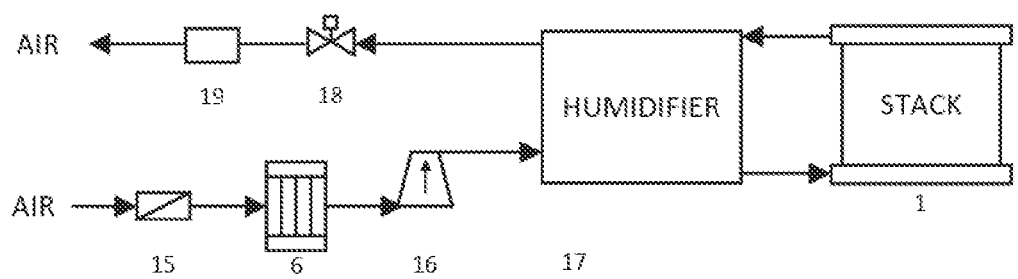
FIG. 2 is a schematic structural diagram of air intake preheating of a fuel cell according to an embodiment of the present invention.

As shown in FIG. 1 and FIG. 2, the present embodiment of the embodiment is one kind of fuel cell vehicle thermal management system with cold start function, including a fuel cell stack 1, the electronic water pump 2, the electronic thermostat 3, the cold start heater 4, The first solenoid valve 5, the thermal management controller 14, and the air intake preheating structure; among them, the electronic water pump 2, the electronic thermostat 3, the cold start heater 4 and the first solenoid valve 5 are all electrically connected to the thermal management controller 14. Connected to and controlled by the thermal management controller 14, the electronic thermostat 3 includes a liquid inlet, a first liquid outlet, and a second liquid outlet, and the air intake preheating structure includes an intake air preheating heat exchanger 6 arranged in an air intake air passage.

As shown in FIG. 1, the coolant outlet of the fuel cell stack 1 is connected to the liquid inlet of the electronic water pump 2 through a pipeline. The electronic water pump 2 is used to adjust the flow of coolant flowing through the electronic water pump 2. The liquid port is connected with the liquid inlet of the electronic thermostat 3 and the liquid inlet of the first solenoid valve 5 through a pipeline. The electronic thermostat 3 is used to adjust the flow ratio between the first liquid outlet and the second liquid outlet. The first liquid outlet of the electronic thermostat 3 is connected to the liquid inlet of the cold start heater 4 through a pipeline. The liquid outlet of the startup heater 4 is connected to the liquid inlet of the fuel cell stack 1 through a pipeline. The cold start heater 4 is used to heat the coolant when the fuel cell stack 1 is cold started. The liquid outlet of the first solenoid valve 5 is connected to the liquid inlet of the intake air preheating heat exchanger 6, and the first solenoid valve 5 is used to adjust the flow rate of the coolant flowing through the intake air preheating heat exchanger 6. The liquid outlet of the intake air preheating heat exchanger 6 is connected to the liquid inlet of the cold start heater 4 through a pipeline. The intake air preheating heat exchanger 6 is used to heat up the air before entering the fuel cell stack 1.

As shown in FIG. 2, the air intake preheating structure further includes an intake filter 15, an intake compressor 16, a humidifier 17, a back pressure valve 18, and a muffler 19. The intake filter 15 is used to filter impurities in the air passage, and the intake compressor 16 is used to drive air into the air passage to increase the concentration of oxygen in the intake air. The humidifier 17 is used to humidify the air entering the airway. The back pressure valve 18 is used to adjust the air pressure inside the fuel cell stack 1 at the air outlet. The muffler 19 is used for silencing the air discharged from the airway. After the air enters the air intake air passage under the driving action of the intake compressor 16, it is filtered by the intake filter 15, heated by the intake preheating heat exchanger 6, and humidified by the humidifier 17, and then enters the fuel cell stack 1. After the mixing and reaction with the fuel in the fuel cell stack 1 is completed, it passes through the humidifier 17, the back pressure valve 18 and the muffler 19 to discharge the air passage in sequence.

The thermal management system for a fuel cell vehicle with cold start function described in this embodiment further includes a waste heat control loop including a second solenoid valve 7, a lithium power battery heat exchanger 8, a lithium power battery 9, the third solenoid valve 10, the passenger compartment heat exchanger 11, the fourth solenoid valve 12 and the fuel cell radiator 13. The lithium power battery heat exchanger 8 is arranged opposite to the lithium power battery 9. The second liquid outlet of the electronic thermostat 3 and the liquid inlet of the second solenoid valve 7 and the liquid inlet of the third solenoid valve 10 and the liquid inlets of the fourth solenoid valve 12 are all connected by pipelines. The liquid outlet of the second solenoid valve 7 is connected to the liquid inlet of the lithium power battery heat exchanger 8. The liquid outlet of the third solenoid valve 10 is connected to the liquid inlet of the passenger compartment heat exchanger 11, and the third solenoid valve 10 is used to adjust the flow of the coolant flowing through the passenger compartment heat exchanger 11. The passenger compartment heat exchanger 11 is used to heat the passenger compartment, the liquid outlet of the fourth solenoid valve 12 is connected to the liquid inlet of the fuel cell radiator 13, and the fourth solenoid valve 12 is used to regulate the flow through the fuel cell radiator 13, the fuel cell radiator 13 is used to provide heat dissipation to the cooling liquid flowing through the fuel cell radiator 13. The liquid outlet of the lithium power battery heat exchanger 8, the liquid outlet of the passenger compartment heat exchanger 11, and the liquid outlet of the fuel cell radiator 13 are all connected to the liquid inlet of the cold start heater 4 through pipelines. The second solenoid valve 7, the lithium power battery heat exchanger 8, the third solenoid valve 10, the passenger compartment heat exchanger 11, the fourth solenoid valve 12 and the fuel cell radiator 13 are all electrically connected to the thermal management controller 14 and managed by heat Control of the controller 14.

Figure 3:
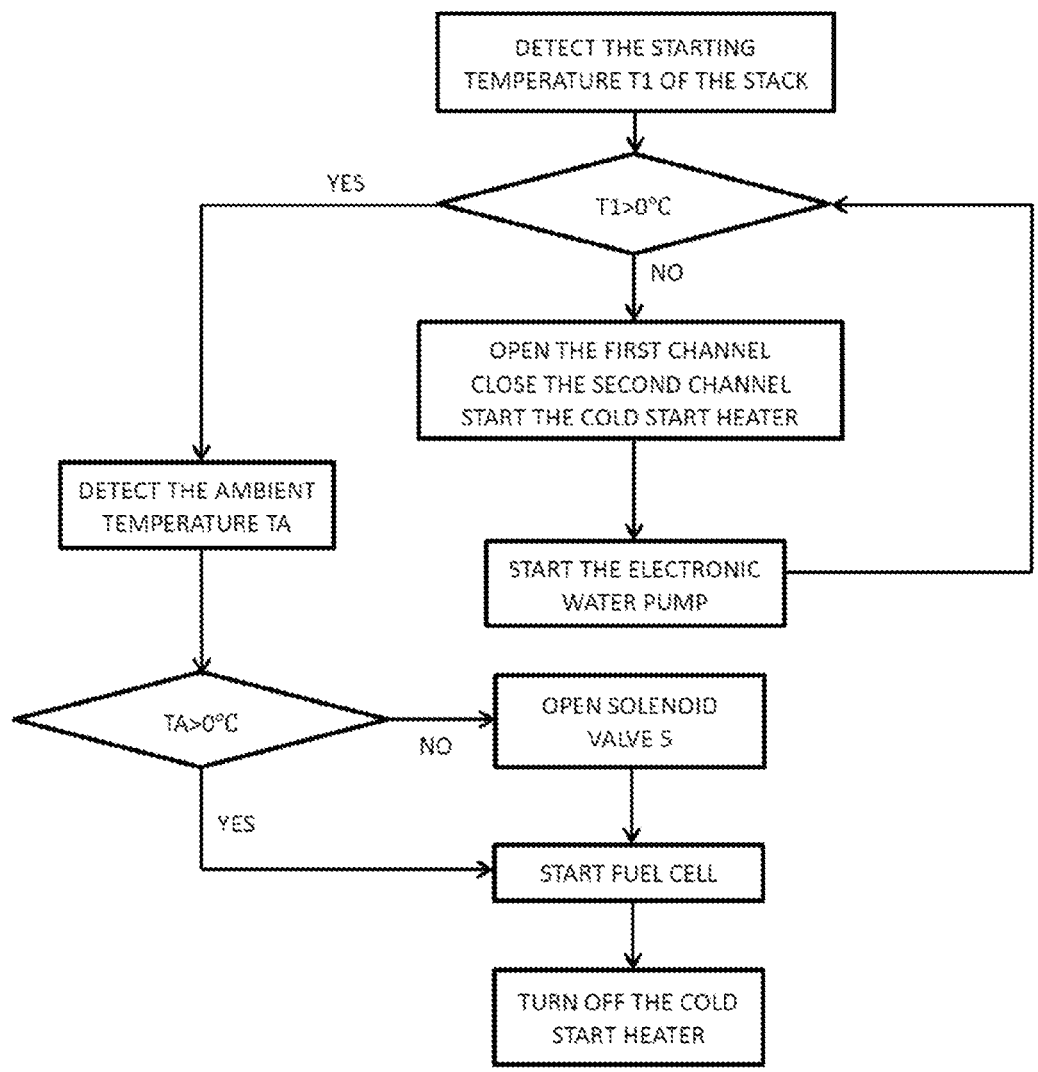
FIG. 3 is a control diagram of the fuel cell cold start system according to an embodiment of the present invention.

This embodiment also provides a control method for a fuel cell vehicle thermal management system with cold start function according to the foregoing, as shown in FIG. 3, including the following steps:

S1. Let the temperature of the coolant outlet of the fuel cell stack 1 be Tout, and the minimum start-up temperature of the fuel cell is TQ. The initial temperature of the coolant outlet of the fuel cell stack 1 is set to T1, and the thermal management controller 14 detects the initial temperature T1 of the coolant outlet of the fuel cell stack 1. If T1≤TQ, this embodiment preferably TQ=0° C., then execute Step S2; if T1>TQ, go directly to step S3. To explain here, the temperature of the coolant in the fuel cell stack 1 is measured by a temperature sensor installed at the coolant outlet of the fuel cell stack 1. The temperature at the coolant outlet is equivalent to the temperature of the coolant in the fuel cell stack 1.

S2. In the cold start mode, the thermal management controller 14 controls the electronic thermostat 3 to open the first liquid outlet and close the second liquid outlet, and at the same time start the cold start heater 4 to heat the coolant, and then start the electronic water pump 2 to adjust the cooling liquid flow. At this time, the coolant only performs a short cycle, and then returns to detect T1. When T1>0° C., the heating of the fuel cell stack 1 is completed, and then step S3 is performed.

S3. The thermal management controller 14 executes a command to detect the ambient temperature TA. The ambient temperature TA is measured by a temperature sensor installed at the air intake port. When the ambient temperature TA>0° C., the air intake does not need to be preheated, and the command to start the fuel cell stack 1 is directly executed. At this time, after the air enters the air intake air passage under the driving action of the intake compressor 16, it is filtered by the intake filter 15 and the intake preheating heat exchanger 6 (At this time, the intake preheating heat exchanger 6 It does not work. Although the air passes through the intake air preheating heat exchanger 6 but is not heated up) and humidified by the humidifier 17, it enters the fuel cell stack 1. When the ambient temperature TA≤0° C., the thermal management controller 14 opens the first solenoid valve 5, then starts the fuel cell stack 1, and starts air intake preheating. After the fuel cell stack 1 starts to work, the high-temperature coolant is pumped out by the electronic water pump 2 and enters the intake air preheating heat exchanger 6 through the first solenoid valve 5. The air is filtered through the intake filter 15 in turn, heated by the intake preheating heat exchanger 6 (about 3-5° C.), compressed and heated by the intake compressor 16, and humidified by the humidifier 17, finally enter the fuel cell stack 1. After the fuel cell stack 1 is working, the cold start heater 4 is turned off to reduce power loss.

S4. After the fuel cell stack 1 works normally, the temperature Tout of the coolant outlet of the fuel cell stack 1 is detected in real time, and the specific detection includes the following:

When the thermal management controller 14 detects Tout≤TL, where TL is the lowest temperature threshold of the coolant outlet of the fuel cell stack 1, preferably TL is 40° C. At this time, the working temperature of the fuel cell stack 1 is low, and the thermal management controller 14 controls the first liquid outlet of the electronic thermostat 3 to open and the second liquid outlet to close, so that the coolant only performs a short cycle;

When the thermal management controller 14 detects TL<Tout<TH, where TH is the highest temperature threshold of the coolant outlet of the fuel cell stack 1, preferably TH is 70° C. At this time, the fuel cell stack 1 is in a suitable operating temperature range, and the thermal management controller 14 controls both the first liquid outlet and the second liquid outlet of the electronic thermostat 3 to open, a short cycle and a full cycle are performed simultaneously;

When the thermal management controller 14 detects Tout≥TH, the working temperature of the fuel cell stack 1 is relatively high. The thermal management controller 14 controls the first liquid outlet of the electronic thermostat 3 to close and the second liquid outlet to open, so that the coolant only performs a full cycle.

In step S4, the short cycle refers to a state where the first liquid outlet of the electronic thermostat 3 is opened and the second liquid outlet is closed. The full cycle refers to the state where the first liquid outlet of the electronic thermostat 3 is closed and the second liquid outlet is opened. When the first liquid outlet and the second liquid outlet of the electronic thermostat 3 are both open, the short cycle and the full cycle are performed simultaneously.

Further, in the step S4, when Tout>TL, that is, when the coolant has a full circle, the thermal management controller 14 also performs waste heat control on the high-temperature coolant flowing from the second outlet of the electronic thermostat 3, which specifically includes the following:

When the lithium power battery 9 needs to be heated, the thermal management controller 14 opens the second solenoid valve 7. Part of the high-temperature coolant enters the lithium power battery heat exchanger 8 and turns on the fan of the lithium power battery heat exchanger 8 to provide warm air insulation for the lithium power battery 9 and make full use of the waste heat of the fuel cell stack 1. When the lithium power battery 9 does not need to be heated, the thermal management controller 14 closes the second solenoid valve 7 and the fan of the lithium power battery heat exchanger 8.

When the passenger compartment needs to be heated, the thermal management controller 14 opens the third solenoid valve 10. Part of the high temperature coolant enters the passenger compartment heat exchanger 11, and the fan of the passenger compartment heat exchanger 11 is turned on to provide warm air for the passenger compartment to make full use of the waste heat of the fuel cell stack 1. When the passenger compartment does not need to be heated, the thermal management controller 14 closes the fan for the third solenoid valve 10 and the cabin heat exchanger 11.

Further, when the fuel cell stack 1 has remaining unusable waste heat, this situation may be that the lithium power battery 9 and the passenger compartment have fully utilized the waste heat, or the lithium power battery 9 and the passenger compartment do not need to be heated. The thermal management controller 14 controls the opening of the fourth solenoid valve 12, the high-temperature coolant enters the fuel cell radiator 13, and controls and regulates the air intake volume of the fan of the fuel cell radiator 13, and the coolant flows back into the fuel cell stack 1 after being cooled down. The battery stack is cooled down while ensuring that TL<Tout<TH.

The above only describes the basic principles and preferred embodiments of the present invention. Those skilled in the art can make many changes and improvements based on the above description, and these changes and improvements should fall within the protection scope of the present invention.

The invention claimed is:

1. A fuel cell vehicle thermal management system with cold start function, comprising:
a fuel cell stack, an electronic water pump, an electronic thermostat, a cold start heater, a first solenoid valve, a thermal management controller, an air intake preheating structure; the electronic water pump, the electronic thermostat, the cold start heater and first solenoid valve are all electrically connected to the thermal management controller; the electronic thermostat includes a liquid inlet, a first liquid outlet and a second liquid outlet; and the air intake preheating structure includes an intake preheating heat exchanger arranged in the air intake duct; a coolant outlet of the fuel cell stack is connected with a liquid inlet of the electronic water pump, and a liquid outlet of the electronic water pump is connected with the liquid inlet of the electronic thermostat and a liquid inlet of the first solenoid valve; the first liquid outlet of the electronic thermostat is connected with a liquid inlet of the cold start heater; a liquid outlet of the cold start heater is connected with a liquid inlet of the fuel cell stack; a liquid outlet of the first solenoid valve is connected with a liquid inlet of the air intake preheating heat exchanger, and a liquid outlet of the air intake preheating heat exchanger is connected with a liquid inlet of the cold start heater.

2. The fuel cell vehicle thermal management system with cold start function of claim 1, wherein the air intake preheating structure further includes an intake filter, an intake compressor, a humidifier, a back pressure valve and a muffler; the air is filtered by the intake filter, heated by the intake preheating heat exchanger, driven by the intake compressor, humidified by the humidifier, and finally enters the fuel cell stack; after mixing and reacting with the fuel in the fuel cell stack, the exhaust gas passes through the humidifier, the back pressure valve and the muffler in sequence.

3. The fuel cell vehicle thermal management system with cold start function of claim 1, wherein the waste heat control loop comprises:
a second solenoid valve, a lithium power battery heat exchanger, and a lithium power battery, a third solenoid valve, a passenger compartment heat exchanger, a fourth solenoid valve and a fuel cell radiator; the lithium power battery heat exchanger is facing the lithium power battery; the second liquid outlet of the electronic thermostat is connected with a liquid inlet of the second solenoid valve, a liquid inlet of the third solenoid valve, and a liquid inlet of the fourth solenoid valve; a liquid outlet of the second solenoid valve is connected with a liquid inlet of the lithium power battery heat exchanger; a liquid outlet of the third solenoid valve is connected with a liquid inlet of the passenger compartment heat exchanger; and a liquid outlet of the fourth solenoid valve is connected with a liquid inlet connection of the fuel cell radiator; a liquid outlet of the lithium power battery heat exchanger, a liquid outlet of the passenger compartment heat exchanger and a liquid outlet of the fuel cell radiator are all connected to the liquid inlet of the cold start heater; the second solenoid valve, the lithium power battery heat exchanger, the third solenoid valve, the passenger compartment heat exchanger, the fourth solenoid valve and the fuel cell radiator are all electrically connected to the thermal management controller.

4. The fuel cell vehicle thermal management system with cold start function of claim 1, wherein a control method comprises:
S1. set the temperature of the coolant outlet of the fuel cell stack as Tout and the minimum start-up temperature of the fuel cell as TQ, the thermal management controller detects the initial temperature T1 of the coolant outlet of the fuel cell stack, if T1<TQ, go to step S2; if T1>TQ, go to step S3 directly;
S2. enter the cold start mode, control the electronic thermostat to open the first liquid outlet and close the second liquid outlet, at the same time start the cold start heater to heat the coolant, the electronic water pump adjust the coolant flow, and then detect T1, when T1>0° C., complete the heating of the fuel cell stack, and then go to step S3;
S3. detect the ambient temperature TA, when the ambient temperature TA>0° C., the air intake does not need to be preheated, and the command to start the fuel cell stack is directly executed; when the ambient temperature TA<0° C., the first solenoid valve is controlled to open, and the command to start the fuel cell stack is executed, at this time, the air intake preheating is turned on; after the fuel cell stack works, the high-temperature coolant enters the intake air preheating heat exchanger; the air entering the air intake duct is heated by the intake preheating heat exchanger and the intake compressor in sequence.

5. The control method of claim 4, wherein the step S3 further comprises: turning off the cold start heater after starting the fuel cell stack.

6. The control method of claim 4, wherein, after step S3, it further comprises step S4, when the fuel cell stack is working normally, detecting the temperature Tout of the coolant outlet of the fuel cell stack, the specific detection is as follows:
when the thermal management controller detects Tout<TL, where TL is the lowest temperature threshold of the stack coolant outlet, it controls the first liquid outlet of the electronic thermostat to open and the second liquid outlet to close, the coolant only performs a short cycle;
when the thermal management controller detects TL<Tout<TH, where TH is the highest temperature threshold of the stack coolant outlet, at this time, the fuel cell stack is in a suitable operating temperature, and the first liquid outlet and the second liquid outlet of the control electronic thermostat are both opened, and the cooling liquid performs a short cycle and a full cycle at the same time;
when the thermal management controller detects Tout≥TH, the first liquid outlet of the electronic thermostat is closed and the second liquid outlet is opened, the coolant only performs a full cycle.

7. The control method of claim 6, wherein the short cycle refers to a state where the first liquid outlet of the electronic thermostat is opened and the second liquid outlet is closed; the full circulation refers to a state where the first liquid outlet of the electronic thermostat is closed and the second liquid outlet is opened; when the first liquid outlet and the second liquid outlet of the electronic thermostat are both open, a short cycle and a full cycle are performed simultaneously.

8. The control method of claim 6, wherein the TL is set at 40° C. and the TH is set at 70° C.

9. The control method of claim 6, wherein when Tout>TL, the thermal management controller performs waste heat control on the high-temperature coolant flowing from the second outlet of the electronic thermostat, which specifically includes the following:
when the lithium power battery needs to be heated, the thermal management controller controls to open the second solenoid valve, part of the high temperature coolant enters the lithium power battery heat exchanger, and controls the fan to open the lithium power battery heat exchanger to provide warm air for the lithium power battery;
when the passenger compartment needs to be heated, the thermal management controller controls to open the third solenoid valve, part of the high-temperature coolant enters the passenger compartment heat exchanger, and controls the fan that opens the passenger compartment heat exchanger to provide warm air for the passenger compartment.

10. The control method of claim 9, wherein when the fuel cell stack has residual heat that cannot be used, the thermal management controller controls to open the fourth solenoid valve, and the remaining high temperature coolant enters the fuel cell radiator, and adjust the air intake of the fan of the fuel cell radiator, and the cooled coolant flows back into the fuel cell stack.

* * * * *